United States Patent
Perez-Rovira (10) Patent No.: US 10,652,342 B2
(45) Date of Patent: May 12, 2020

(54) METHODS AND SYSTEMS FOR IDENTIFYING A CLIENT COMPUTER SYSTEM

(71) Applicant: Daon Holdings Limited, George Town (KY)

(72) Inventor: Adria Perez-Rovira, Barcelona (ES)

(73) Assignee: DAON HOLDINGS LIMITED, West Bay (KY)

( * ) Notice: Subject to any disclaimer, the term of this patent is extended or adjusted under 35 U.S.C. 154(b) by 71 days.

(21) Appl. No.: 15/973,844

(22) Filed: May 8, 2018

(65) Prior Publication Data

US 2019/0349437 A1   Nov. 14, 2019

(51) Int. Cl.
*H04L 29/08* (2006.01)
*H04L 29/06* (2006.01)
*G06F 3/02* (2006.01)

(52) U.S. Cl.
CPC ............ *H04L 67/146* (2013.01); *H04L 67/02* (2013.01); *H04L 67/42* (2013.01); *G06F 3/0227* (2013.01)

(58) Field of Classification Search
None
See application file for complete search history.

(56) References Cited

U.S. PATENT DOCUMENTS

| | | | |
|---|---|---|---|
| 9,420,049 B1 * | 8/2016 | Talmor | H04L 67/02 |
| 9,577,889 B1 * | 2/2017 | Dumitrascu | H04L 41/22 |
| 2017/0054987 A1 * | 2/2017 | Rangarajan | H04N 19/167 |
| 2017/0154366 A1 * | 6/2017 | Turgeman | G06Q 30/0275 |
| 2019/0036959 A1 * | 1/2019 | Ford | G06F 21/552 |

FOREIGN PATENT DOCUMENTS

EP   3 211 825 A1   8/2017

OTHER PUBLICATIONS

An online mouse polling rate test, https://geekhack.org/index.php?topic=86013.0, Nov. 24, 2016.
An Extended European search report dated Sep. 10, 2019 for European Patent Office Application No. 19168513.0-1218, pp. 1-10.

* cited by examiner

*Primary Examiner* — Scott B Christensen
(74) *Attorney, Agent, or Firm* — Kevin McDermott, Esq.

(57) ABSTRACT

A method identifying a client computer system is provided that includes requesting over a network, by a client computer system, to access a server computer system operating an online service. The client computer system includes an input device. Moreover, the method includes granting access, by the server computer system, to the client computer system, and capturing input data from the client computer system, by the server computer system. The input data is generated by activity of the input device. Furthermore, the method includes calculating temporal differences from the captured input data, a distribution from the temporal differences, and a clustering tendency and a clustering period for the distribution from the captured input data. Additionally, the method includes identifying, by the server computer system, the client computer system when the calculated clustering tendency and clustering period match corresponding data for a client computer system stored in the server computer system.

19 Claims, 7 Drawing Sheets

METHODS AND SYSTEMS FOR IDENTIFYING A CLIENT COMPUTER SYSTEM

BACKGROUND OF THE INVENTION

This invention relates generally to identifying client computer systems, and more particularly, to methods and systems for identifying a client computer system based on a distribution of temporal differences between user input events.

Websites offer on-line services to their visitors which typically differ by provider. For example, governmental entities may provide information to their visitors while companies advertise products and hopefully conduct sales with their customers. It is known that providers spend a great deal of time and money developing their websites and expect a reasonable return on their investment. Successful websites are typically tailored to suit the needs of their visitors. Consequently, most providers monitor visitors to their websites and visitor usage. Information obtained through monitoring is used to tailor the services offered to each visitor.

Generally, visitors are identified via their client computer systems using a combination of hypertext transfer protocol (HTTP) cookies and device fingerprinting technology. HTTP cookies are typically used to identify visitors across multiple browsing sessions. However, HTTP cookies can be deleted between sessions, so it is possible that identification with cookies cannot be achieved. When cookies are not available, visitors may be identified using device fingerprinting. Device fingerprinting typically involves querying basic web browser configuration information from a client computer system or from client-side scripting languages such as Javascript or HTML canvas to collect partially unique information. Such partially unique information typically includes the browser version and/or configuration, information about the operating system, the central processing unit (CPU), screen resolution, languages configured in the browser, and rendering capabilities of the client computer system. Website providers store this information for each visitor. This information is partially unique because different client computer systems might have similar information. For example, the client computer systems of two different visitors might run the same operating system and have browsers configured in the same languages.

Many websites automatically conduct device fingerprinting when a client computer system visits the site. The obtained information is matched against stored visitor information from previous sessions in an effort to identify a returning visitor/client computer system. The information stored for the visitors may be used in many ways. For example, if the visitor is identified as a previous visitor, advertising tailored to the visitor's prior site usage may be displayed for the visitor to see in an effort to increase sales. However, a reliable match might not always be determined. As a result, the information collected using contemporary device fingerprinting technology may not accurately identify visitors resulting in lost opportunities for sales.

BRIEF DESCRIPTION OF THE INVENTION

In one aspect, a method for identifying a client computer system is provided that includes requesting over a network, by a client computer system, to access a server computer system operating an online service. The client computer system includes an input device. Moreover, the method includes granting access, by the server computer system, to the client computer system, and capturing input data from the client computer system, by the server computer system. The input data is generated by activity of the input device. Furthermore, the method includes calculating temporal differences from the captured input data, a distribution from the temporal differences, and a clustering tendency and a clustering period for the distribution from the captured input data. Additionally, the method includes identifying, by the server computer system, the client computer system when the calculated clustering tendency and clustering period match corresponding data for a client computer system stored in the server computer system.

In another aspect, an apparatus for facilitating identification of a client computer system is provided that includes a processor and a memory. The memory is configured to store data and the apparatus is associated with a network. The memory is in communication with the processor and has instructions stored thereon which, when read and executed by the processor, cause the apparatus to receive, over a network, a request from a client computer system to access the apparatus. The apparatus operates an online service. Moreover, the instructions when read and executed by the processes, cause the apparatus to grant access to the client computer system. The client computer system includes an input device. Furthermore, the instructions when read and executed by the processes, cause the apparatus to capture input data from the client computer system. The data is generated by activity of the input device. Additionally, the instructions when read and executed by the processes, cause the apparatus to calculate temporal differences from the captured input data, calculate a distribution from the temporal differences, calculate a clustering tendency and a clustering period for the distribution from the captured input data, and identify the client computer system when the clustering tendency and clustering period match corresponding data of a client computer system stored in the apparatus.

In yet another aspect, a method for identifying a client computer system includes requesting over a network, by a client computer system, to access a server computer system operating an online service. The client computer system includes at least one input device. Moreover, the method includes granting access, by the server computer system, to the client computer system and capturing input device data, by the client computer system, generated by activity of the at least one input device. Furthermore, the method includes calculating, by the client computer system, a distribution for each of the at least one input devices from the captured data, and a clustering tendency and a clustering period for each distribution from the captured input device data. Additionally, the method includes identifying, by the server computer system, the client computer system when the calculated clustering tendency and clustering period for each distribution match corresponding values for a client computer system stored in the server computer system.

DETAILED DESCRIPTION OF THE INVENTION

Figure 1:
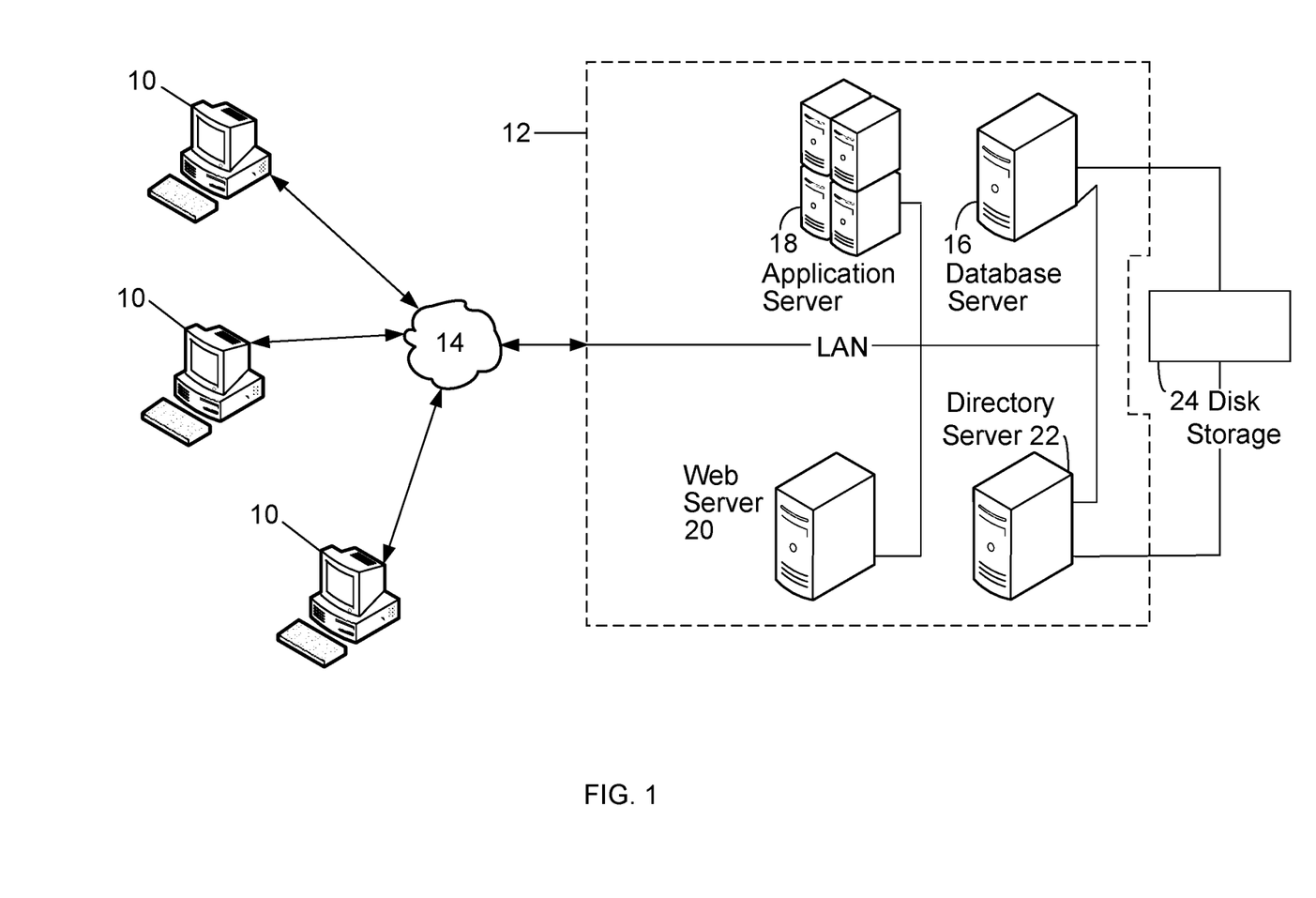
FIG. 1 is a diagram illustrating example client computer systems and an example server computer system communicating over a network.

FIG. 1 is a diagram illustrating example client computer systems 10 and an example server computer system 12 communicating over a network 14. One example of the client computer systems 10 is a personal computer. Other examples include, but are not limited to, a laptop computer and a mainframe computer. The client computer systems 10 may be different from each other. For example, one client computer system 10 may be a personal computer while another client computer system 10 may be a laptop computer. The client computer systems 10 can be used to access the server computer system 12.

The server computer system 12 includes a data base server 16, an application server 18, a web server 20, and a directory server 22. A disk storage unit 24 is coupled to the database server 16 and directory server 22. Servers 16, 18, 20, and 22 may be coupled in a local area network (LAN) or may be coupled together over the network 14. The server computer system 12 may be the computer system for a service provider who remotely conducts business or offers services over the network 14. Such service providers include, but are not limited to, financial institutions, medical facilities, national security agencies, and merchants. Thus, the server computer system 12 provides and/or operates an on-line service.

Figure 2:
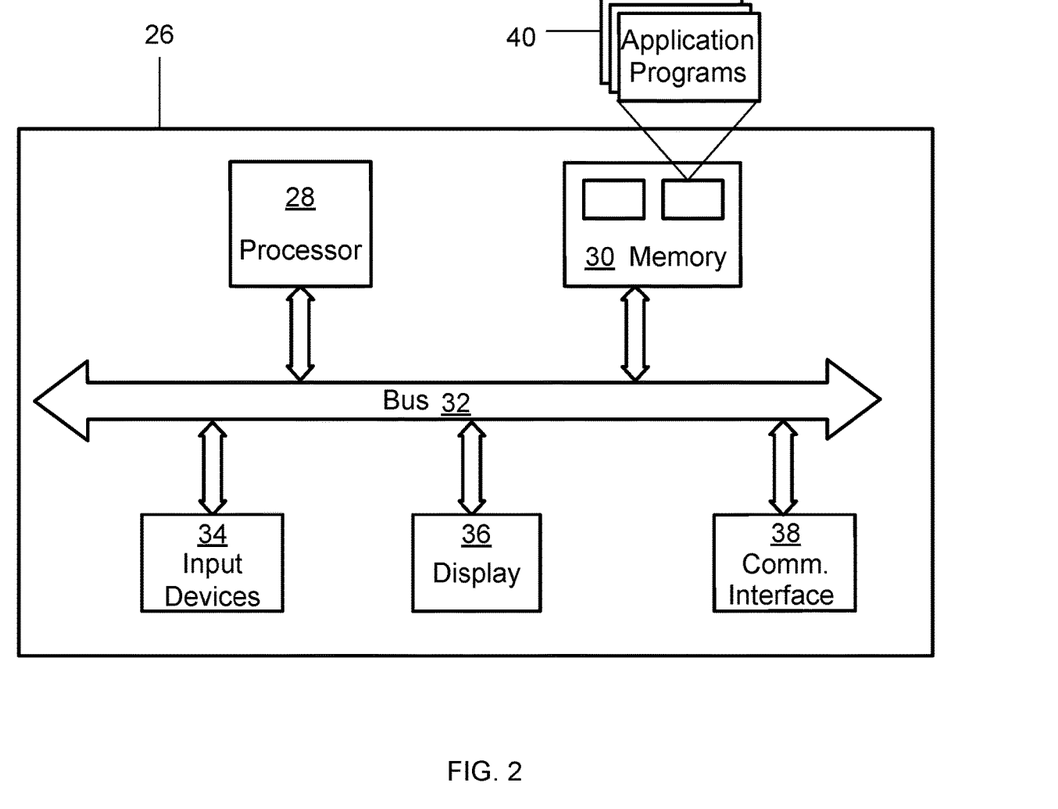
FIG. 2 is a diagram illustrating an example architecture of components that may be included in the client and server computer systems shown in FIG. 1.

FIG. 2 is a diagram illustrating an example architecture 26 of components that may be included in the client computer systems 10 and the servers 16, 18, 20, and 22. The example computer architecture 26 includes components such as, but not limited to, one or more processors 28, a memory 30, a bus 32, user input devices 34, a display 36, and a communications interface 38. General communication between the components is provided via the bus 32.

The processor 28 executes instructions, or computer programs, stored in the memory 30. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

As used herein, the term "computer program" is intended to encompass an executable program that exists permanently or temporarily on any non-transitory computer-readable recordable medium that causes a client computer system 10 or a server 16, 18, 20, 22 to perform at least a portion of the functions and/or methods described herein. Application programs 40, also known as applications, are computer programs stored in the memory 30. Application programs 40 include, but are not limited to, an operating system, applications that use pre-trained models based on machine learning algorithms, an Internet browser application, and any special computer program that manages the relationship between application software and any suitable variety of hardware that helps to make-up a computer system or computing environment.

The memory 30 may be any non-transitory computer-readable recording medium used to store data including, but not limited to, computer programs and user data records. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like. Furthermore, the non-transitory computer-readable recording media may be implemented as smart cards, SIMs, any type of physical and/or virtual storage, or any other digital source such as a network or the Internet from which a computing device can read computer programs, applications or executable instructions.

The user input devices 34 and the display 36 allow interaction between a user and a client computer system 10 and/or the server computer system 12. The display 36 may include a visual display or monitor that displays information to a user. For example, the display 36 may be a Liquid Crystal Display (LCD), active matrix display, plasma display, or cathode ray tube (CRT). The user input devices 34 include, but are not limited to, a keypad, a keyboard, a mouse, a joystick, a gamepad, a microphone, and one or more cameras. Although not shown, the example architecture 26 may also include output devices including, but not limited to, printers and/or speakers.

The communications interface 38 provides the client computer systems 10 and the server computer system 12 with two-way data communications. Moreover, the communications interface 38 enables the client computer systems 10 and server computer system 12 to conduct wireless communications such as cellular telephone calls and to wirelessly access the Internet over the network 14. By way of example, the communications interface 38 may be a digital subscriber line (DSL) card or modem, an integrated services digital network (ISDN) card, a cable modem, or a telephone modem to provide a data communication connection to a corresponding type of telephone line. As another example, the communications interface 38 may be a local area network (LAN) card (e.g., for Ethernet™ or an Asynchronous Transfer Model (ATM) network) to provide a data communication connection to a compatible LAN. As yet another example, the communications interface 38 may be a wire or a cable connecting the client computer systems 10 and the server computer system 12 with a LAN, or with accessories such as, but not limited to, biometric modality data capture devices. Further, the communications interface 38 may include peripheral interface devices, such as a Universal Serial Bus (USB) interface, a PCMCIA (Personal Computer Memory Card International Association) interface, and the like. Thus, it should be understood the communications interface 38 may enable the client computer systems 10 and server computer system 12 to conduct any type of wireless or wired communications such as, but not limited to, accessing the Internet.

The communications interface 38 also allows the exchange of information across the network 14. The exchange of information may involve the transmission of radio frequency (RF) signals through an antenna (not shown). Moreover, the exchange of information may be between one of the client computer systems 10 and any other client computer systems 10 (not shown) and any other server computer systems (not shown) capable of communicating over the network 14. The network 14 may be a 5G communications network. Alternatively, the network 14 may be any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 14 may also be any type of wired network or a combination of wired and wireless networks.

Examples of other server computer systems include computer systems of service providers such as, but not limited to, financial institutions, medical facilities, national security agencies, and merchants. Examples of other client computer systems include, but are not limited to, smart phones, tablet computers, phablet computers, laptop computers, personal computers and cellular phones. The other client computer systems may be associated with any individual or with any type of entity including, but not limited to, commercial and non-commercial entities. The client computer systems may alternatively be referred to as computing devices or information systems, and the server computer systems may alternatively be referred to as information systems.

When the user input devices 34 include a keyboard operated by a person, the keyboard generates key event data. Keyboards can communicate key event data to the operating system of the client computer system 10 using a synchronous or a nonsynchronous communication protocol. Synchronous protocols communicate key event data immediately, or always with the same amount of delay, from the keyboard to the operating system of the client computer system 10. An example synchronous protocol, PS/2, is typically used on laptop computers but is seldom used on modern desktop computers. Asynchronous protocols do not communicate key event data immediately. Rather, such protocols store the key event data in a buffer of the keyboard and wait until the operating system checks the buffer for new data. When the buffer is checked, the stored key event data is communicated to the operating system. The time between buffer checks is called the polling period. Universal serial bus (USB) is an example asynchronous protocol.

The polling period for each client computer system 10 is typically determined by the interaction between the operating system, keyboard drivers, and the communication protocol. The frequency with which the operating system checks the buffer is called the polling rate, which is the inverse of the polling period, and thus equally dictated by the interaction between the operating system, keyboard drivers, and the communication protocol. A common polling rate of a USB protocol is 125 Hertz (Hz). Based on the 125 Hz polling rate, the operating system of a client computer system 10 attempts to check the keyboard buffer 125 times per second which equates to an eight-millisecond polling period. Although the polling period and polling rate for a USB protocol are described herein, the polling period and polling rate for any other protocol may alternatively be used. Moreover, the polling period may be any value that facilitates identifying client computer systems as described herein.

A key event may be generated when a key is pressed or when a key is released. Key events communicated using an asynchronous protocol with a regular polling rate, have a time between key event captures given by n*p, where "p" is the polling period in milliseconds and "n" is the number of times the operating system checked the keyboard buffer before registering the most recent key event. Consequently, the temporal difference between key events is a multiple of "p".

Client computer operating systems using asynchronous protocols are designed to regularly check the contents of the keyboard buffer in accordance with the polling period. However, such operating systems frequently do not check the buffer contents in accordance with the polling period and instead check the buffer irregularly. The irregular checks manifest an irregularity in the polling. Thus, when the polling period is 8 milliseconds such operating systems may check the contents of the buffer at times less than and/or greater than 8 milliseconds resulting in an irregularity in the polling. Example irregular times include, but are not limited to, 7.9, 8.1 or 8.2 milliseconds.

The polling irregularity results from interaction between the operating system, the communication protocol, hardware, software, keyboard driver implementation, and other devices that may be connected to USB ports of the client computer system 10. Different USB communication protocol versions may also affect the polling period. The different versions include USB1, USB2, USB3, and USB3.1.

Figure 3:
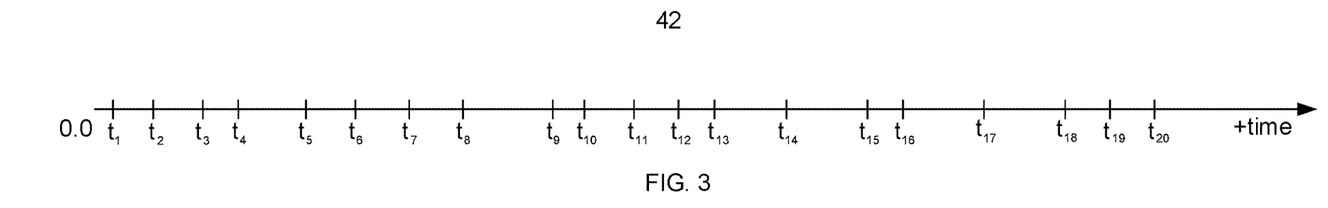
FIG. 3 is a diagram illustrating times at which example key events were captured.

FIG. 3 is a diagram 42 illustrating the times at which twenty example key events were captured by a client computer system 10. Alternatively, the diagram 42 may include the times at which any number of key events were captured. The time at which each key event was captured is designated $t_m$, where "m" is the number of the key event. So, for the first key event the time is $t_1$, for the second key event the time is $t_2$, for the third key event the time is $t_3$, and so on.

Figure 4:
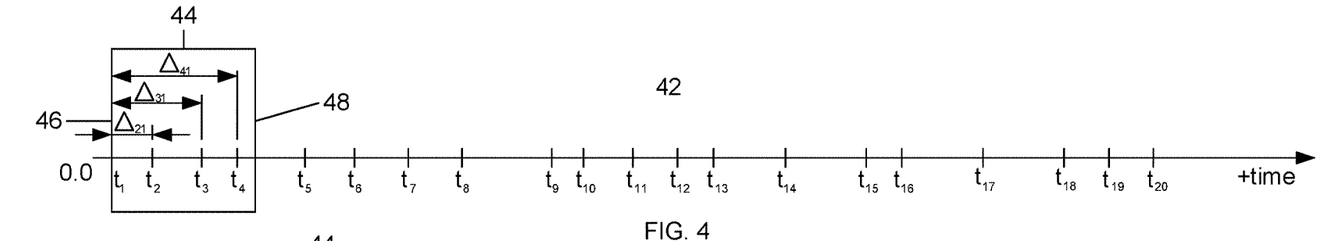
FIG. 4 is the diagram shown in FIG. 3, further including a temporal window located in an initial position.
Figure 5:
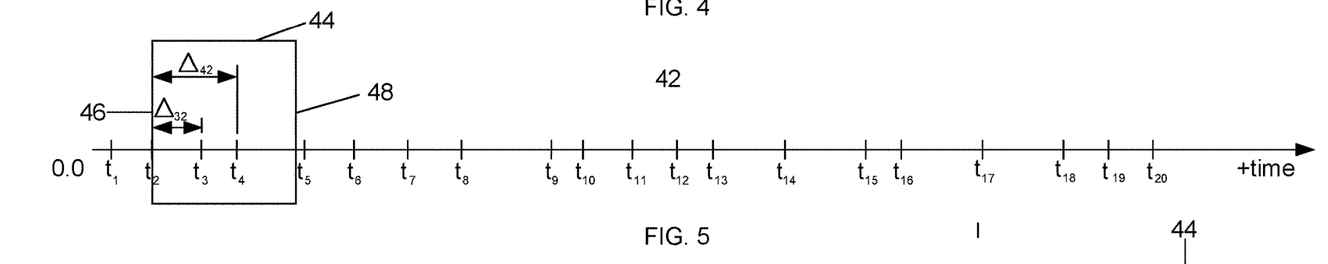
FIG. 5 is the diagram shown in FIG. 4; however, the temporal window is located in a second position.
Figure 6:
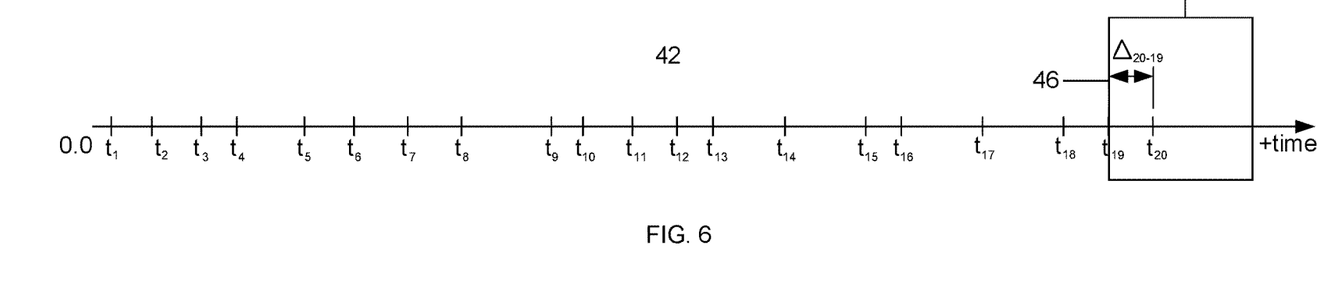
FIG. 6 is the diagram shown in FIG. 5; however, the temporal window is located in a final position.

The information shown in FIGS. 4-6 is substantially the same information shown in FIG. 3 as described in more detail below. As such, features illustrated in FIGS. 4-6 that are identical to features illustrated in FIG. 3, are identified using the same reference numerals used in FIG. 3.

FIG. 4 is the diagram 42 illustrating the key event times shown in FIG. 3, further including a temporal window 44. The temporal window 44 is located in an initial position in which a left side 46 of the window 44 is positioned at $t_1$, the time of the first key event. The window 44 has a half second duration. Alternatively, the window 44 may be of any duration that facilitates collecting key event time data for use in calculating a distribution of temporal differences between key events as described herein.

The window 44 is translated in the direction of increasing time over the key event times by incrementally positioning the left side 46 at the time of each key event. The temporal window 44 may alternatively be translated in any manner that facilitates generating data for use in calculating distributions of temporal differences between key events. For example, a right side 48 of the window 44 may be positioned at the time of each key event.

In each different position, the window 44 defines a different group of times at which key events were captured. Because the window positions will likely overlap with each other some of the times may be included in more than one group.

In each different position of the window 44, the difference between the time of the earliest key event in the group defined by the window and the time of each other key event in the group is calculated. In the initial position, the window 44 contains the times of the first, second, third, and fourth key events. Thus, for the initial position, a temporal difference between the first and second key events $\Delta_{21}$ is calculated as $t_2-t_1$, a temporal difference between the first and third events $\Delta_{31}$ is calculated as $t_3-t_1$, and a temporal difference between the first and fourth events $\Delta_{41}$ is calculated as $t_4-t_1$. After storing the calculated differences, the window 44 is translated into the next, or second, position. The calculated differences may be stored in the server computer system 12 or the client computer system 10.

FIG. 5 is the diagram 42 shown in FIG. 4; however, the temporal window 44 is located in the second position. More specifically, the left side 46 of the window 44 is positioned at the time of the second key event, $t_2$. The group of key event times defined by the window includes the times of the second, third and fourth key events. Thus, the temporal differences 432 and 442 are calculated and stored. After storing the temporal differences, the window 44 is translated into the next position.

FIG. 6 is the diagram 42 shown in FIG. 5; however, the temporal window 44 is located in the final position. In the final position, the left side 46 of the window 44 is flush with the time of the next-to-last key event and the window defines a group which includes the times of the last two key events. The temporal differences between these two events are calculated and stored. The window 44 is thus translated over the key event times, and temporal differences are thus calculated for each position of the window. It should be understood that the temporal differences may alternatively be calculated in any manner and that it is not necessary to use the window 44 to calculate the temporal differences. For example, the temporal differences may be calculated by computing the difference between all possible pairs of key event times. The stored temporal differences for a client computer system 10 may be plotted in a histogram which illustrates a distribution of the temporal differences.

Figure 7:
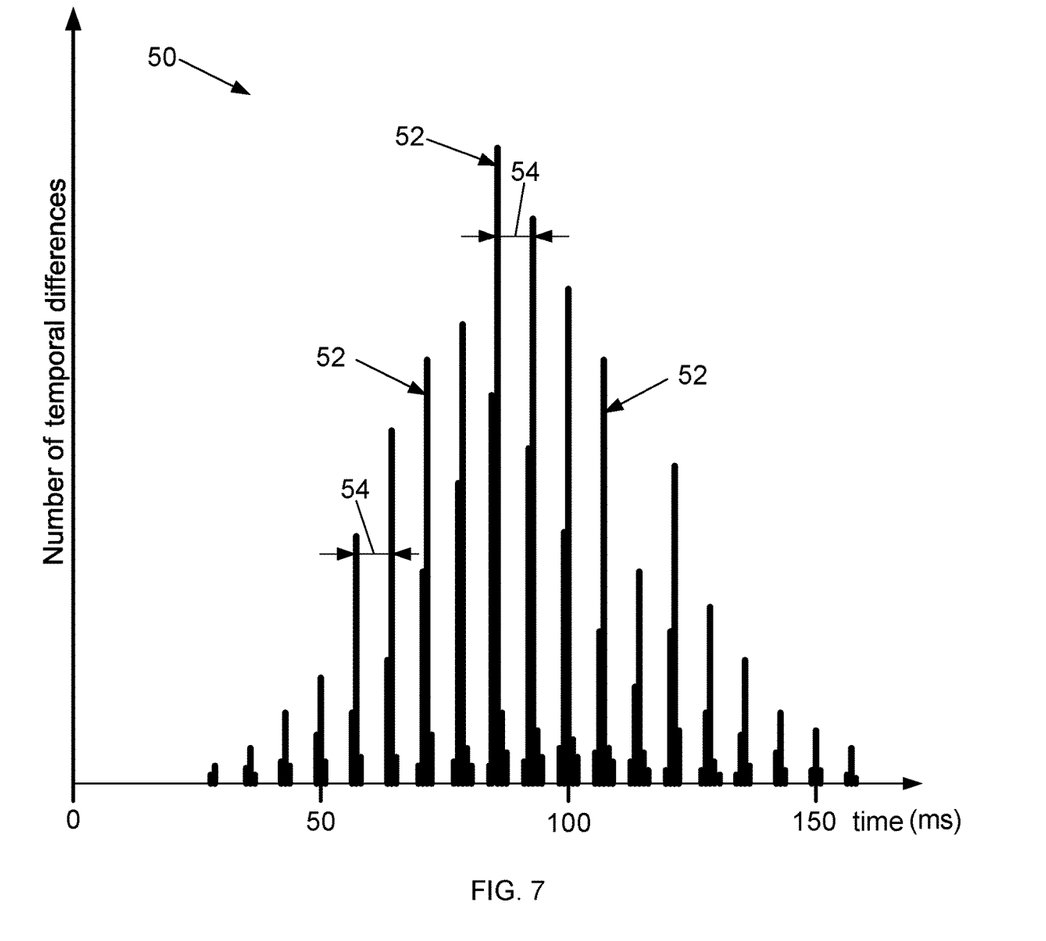
FIG. 7 is a histogram illustrating an example distribution of temporal differences between key events for a client computer system.

FIG. 7 is a histogram illustrating an example distribution 50 of temporal differences between key events for a client computer system 10. The distribution 50 was calculated from the stored temporal differences for the client computer system 10. The horizontal axis represents values of temporal differences between key events and is partitioned into one millisecond segments. The vertical axis represents numbers of temporal differences that can be used to determine the number of temporal differences within each segment.

The distribution 50 includes clusters 52 of temporal differences. Few temporal differences between clusters 52 make the clusters 52 prominent and thus readily identifiable. The prominence of the clusters 52 may be expressed as a ratio of the number of temporal differences in the clusters 52 to the number of temporal differences between clusters. Alternatively, the prominence may be expressed in any other manner.

The clustering tendency of temporal differences for a client computer system is a measure of how much the temporal differences tend to cluster. Consequently, the clustering tendency may be used to determine whether the temporal differences for a client computer system 10 include clusters 52 and whether the clusters 52 are prominent. The clustering tendency may be calculated using a variety of techniques including, but not limited to, hierarchical clustering, variance analysis, variance on a shifting window, kurtosis, or goodness of fit of a smoothed function or any other function. The distribution 50 has a high cluster tendency because it includes prominent clusters 52.

The clusters 52 are separated by a distance 54. The distances 54 are used to calculate a clustering period. The clustering period may be calculated using any combination of Fourier analysis, autocorrelation, function fitting, peak detection, or any other period detecting technique. For the distribution 50, the clustering period is 8 milliseconds.

It should be understood that the combination of user input actions and client computer system characteristics might result in different distributions of key event temporal differences. The clustering tendency and clustering period of the distributions are independent of user input actions and are determined solely by characteristics of the client computer system 10. Such characteristics include, but are not limited to, the interaction of the operating system, the communication protocol, hardware, software, keyboard driver implementation, and other devices that may be connected to USB ports of the client computer system 10. Moreover, the clustering tendency and the clustering period are a consequence of the irregularity in polling and the polling period, respectively, of the client computer system 10. As a result, the clustering tendency and clustering period may be used to infer the polling irregularity and the polling period, which may be used to facilitate identifying client computer systems 10 attempting to access the server computer system 12. Additionally, it should be understood that the clustering tendency and clustering period are information that may supplement information used in contemporary identification methods and systems to enhance the accuracy and trustworthiness of client computer system identification results.

Synchronous communication protocols do not exhibit a clustering tendency while asynchronous communication protocols do. As a result, the clustering tendency may also be used to distinguish between client computer systems 10 using synchronous versus asynchronous communication protocols. Laptop computers usually use synchronous communication protocols while desktop personal computers nearly always use asynchronous communication protocols. Thus, client computer systems exhibiting a clustering tendency can be identified as desktop personal computers and client computer systems that do not exhibit a clustering tendency can be identified as laptop computers.

Figure 8:
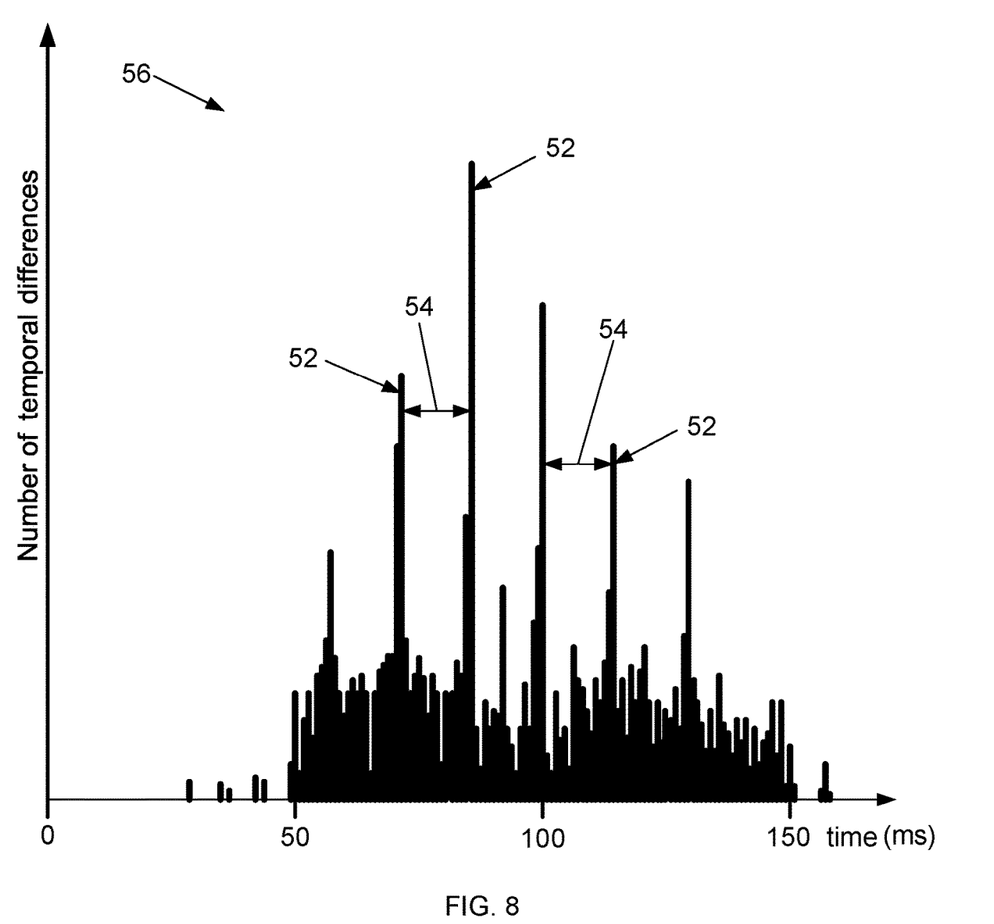
FIG. 8 is histogram illustrating another example distribution of temporal differences between key events for a different client computer system.

FIG. 8 is a histogram illustrating another example distribution 56 of temporal differences between key events for a different client computer system 10. The distribution 56 was calculated from the stored temporal differences for the different client computer system 10. The distribution 56 shows a lower clustering tendency and a larger clustering period than the distribution 50. For the distribution 56, the clustering period is 16 milliseconds.

Figure 9:
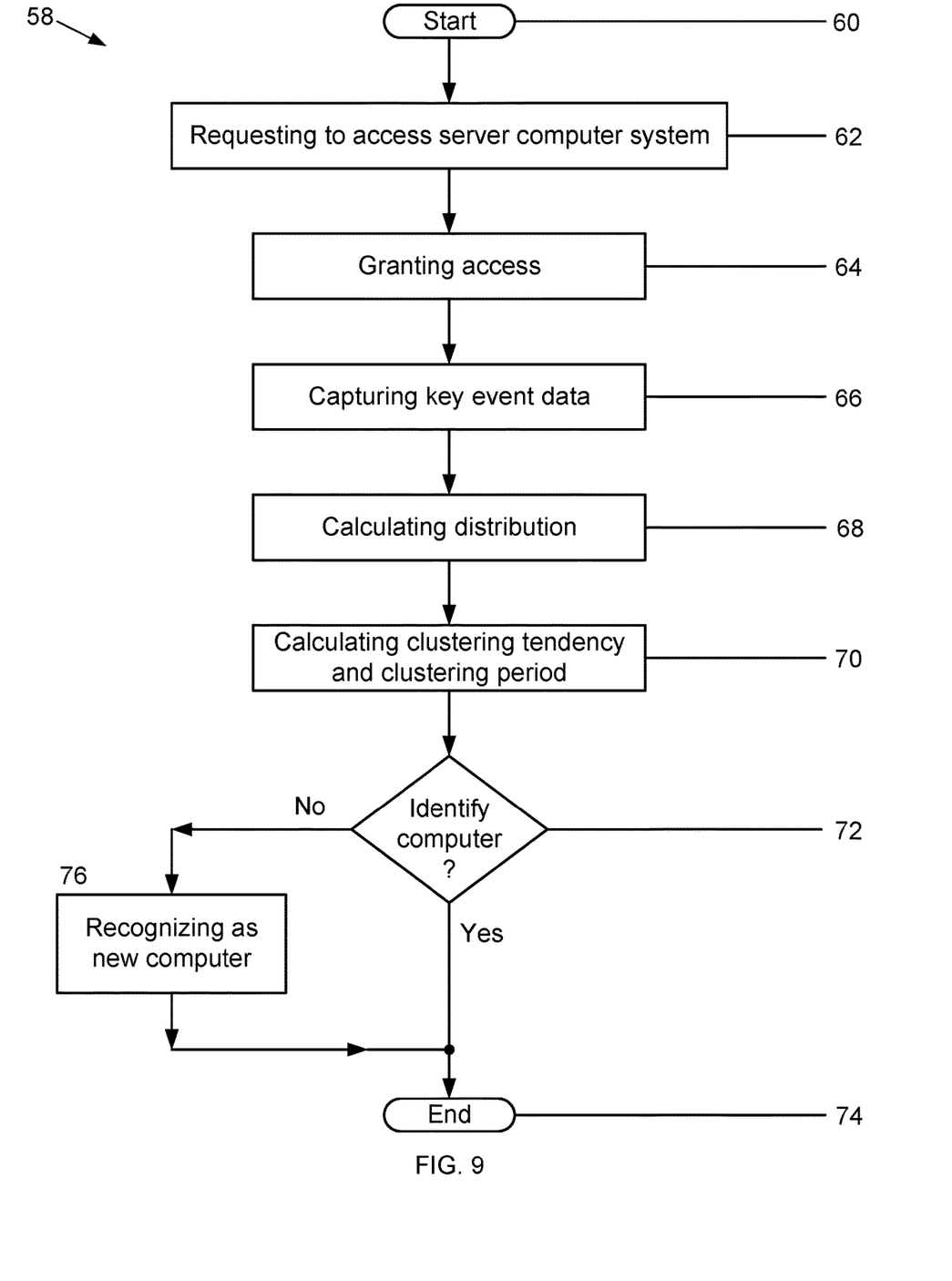
FIG. 9 is a flowchart illustrating an example method for identifying a client computer system.

FIG. 9 is a flowchart 58 illustrating an example method for identifying a client computer system 10. The method starts 60 with a client computer system 10 requesting 62 to access the server computer system 12 via the network 14. In response to the request, the server computer system 12 grants 64 access to the requesting client computer system 10 and captures key event data 66 from the requesting client computer system 10 while the system 10 accesses the server computer system 12. After capturing the key event data 66, the server computer system 12 continues by calculating 68 a distribution of temporal differences between key events.

Next, the server computer system 12 continues by calculating 70 the clustering tendency and the clustering period of the distribution. These two values are used to identify 72 the requesting client computer system 10. More specifically, the server computer system 12 compares 72 the calculated clustering tendency and clustering period against the clustering tendency and clustering period, respectively, of client computer systems stored therein. The clustering tendency and clustering periods stored in the server computer system 12 are for client computer systems that previously requested access to the server computer system 12.

If there is a match with a client computer system 10, the server computer system 12 successfully identifies 72 the requesting client computer system as the matching client system and processing ends 74. By successfully identifying the requesting client computer system 10, the server computer system 12 confirms that the requesting client computer system 10 previously accessed, or requested access to, the server computer system 12. Otherwise, when there is no match the server computer system 12 is unable to identify 72 the requesting client computer system 10 and continues by recognizing 76 the requesting client computer 10 as a new client computer, obtaining data from the requesting client computer 10, and storing the obtained data therein. Next, processing ends 74.

Any method may be used to determine whether the clustering tendency and clustering period match those of a client computer system 10 stored in the server computer system 12. For example, a match may be determined when the difference in clustering tendencies and the difference in clustering periods between the requesting client computer system 10 and a record client computer system are less than a certain percentage. The certain percentage may be between about zero and twenty percent.

Figure 10:
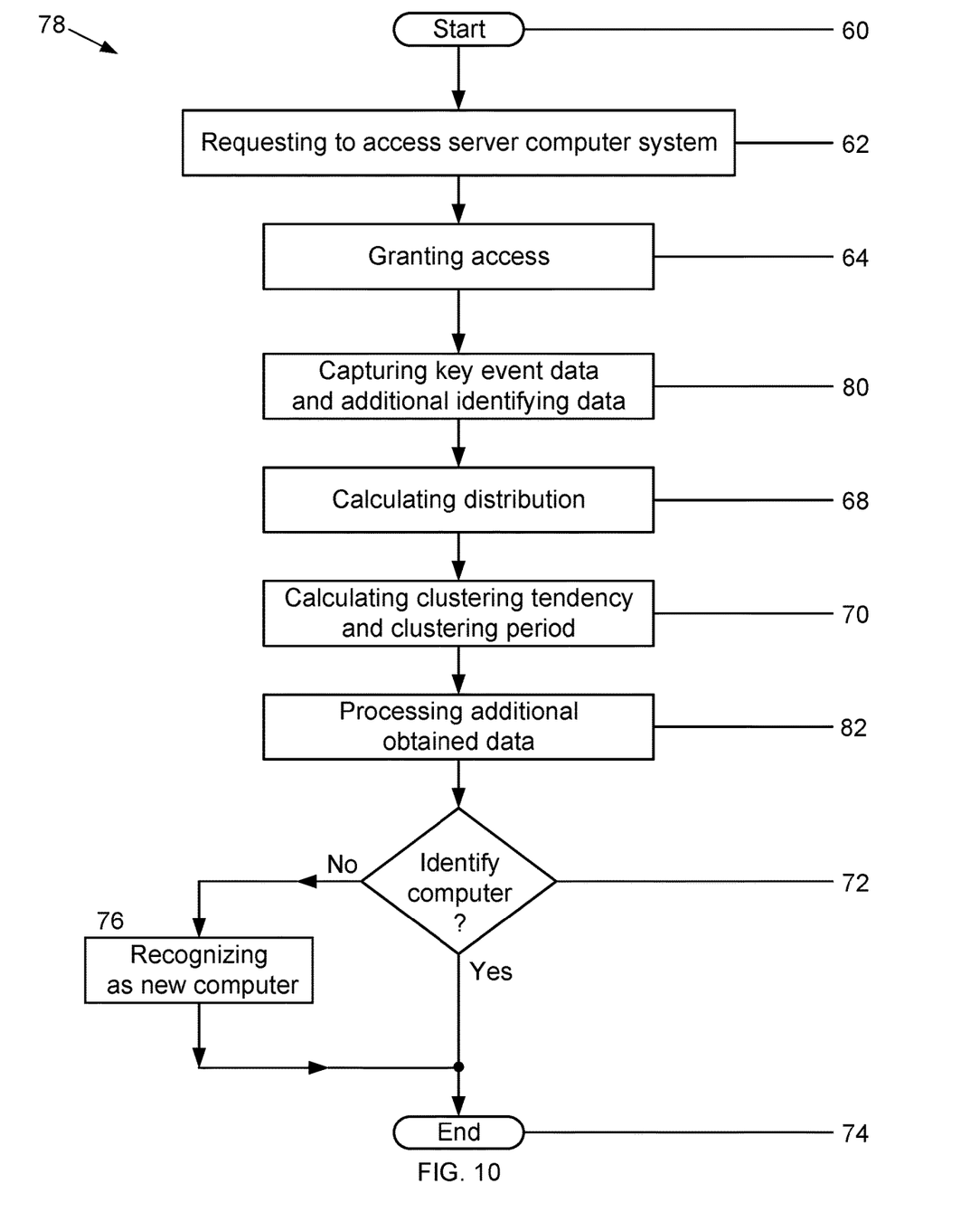
FIG. 10 is a flowchart illustrating an alternative example method for identifying a client computer system.

The information shown in FIG. 10 is the same information shown in FIG. 9 as described in more detail below. As such, features illustrated in FIG. 10 that are identical to features illustrated in FIG. 9 are identified using the same reference numerals used in FIG. 9.

FIG. 10 is a flowchart 78 illustrating an alternative example method for identifying a client computer system 10. This alternative method is similar to that shown in FIG. 9. However, additional data are captured from the client computer system 10. More specifically, after granting access 64 to the requesting client computer system 10, the server computer system 12 captures the key data as well as additional identifying data 80 from the client computer system 10. Such additional data includes, but is not limited to, the browser version and/or configuration, information about the operating system, the central processing unit (CPU), screen resolution, languages configured in the browser, and rendering capabilities of the client computer system 10. After calculating 68 the temporal difference distribution, and after calculating 70 the clustering tendency and the clustering period of the distribution, the server computer system 12 processes 82 and stores the additional captured data. Next, the server computer system 12 continues by comparing 72 each item of additional data against corresponding data for each client computer system 10 stored therein. The server computer system 12 also compares 72 the calculated clustering tendency and clustering period against the clustering tendency and clustering period, respectively, of client computer systems 10 stored therein.

If the items of additional data, clustering tendency, and clustering period match 72 the corresponding data of any client computer stored in the server system 12, the requesting client computer system 10 is successfully identified 72 as the matching client computer system. Next, processing ends 74. However, if the items of additional data, clustering tendency, and clustering period do not match the corresponding record data of a client computer stored in the server system 12, the server computer system 12 is unable to identify the requesting client computer system. As a result, the server computer system 12 continues by recognizing 76 the requesting client computer 10 as a new client computer, obtaining data from the requesting client computer 10, and storing the obtained data. Next, processing ends 74.

Although the alternative example method described herein successfully identifies a client computer system 10 after matching the items of additional data, clustering tendency, and clustering period with corresponding record data of a client computer system 10, a client computer system may alternatively be successfully identified when a subset of the items of data match corresponding record data. For example, a requesting client computer system 10 may be successfully identified when the clustering tendency does not match, when the clustering period does not match, or when any item of the additional data does not match.

In the alternative example method, data in addition to the key event data, is captured from the client computer system and the client computer system is identified using the additional data as well as the clustering tendency and clustering period. Contemporary client computer identification methods and systems make a successful identification when data, the same as or similar to, the additional data matches corresponding data for a client computer system stored in the server computer system 12. By also comparing the clustering tendency and clustering period against corresponding data for client computer systems that previously requested access to the server computer system, the accuracy and trustworthiness of client computer system identifications are facilitated to be increased in the same time with little to no increase in cost, and costs incurred as a result of inaccurate identifications are facilitated to be reduced.

The example methods described herein may be conducted entirely by the server computer system 12, or partly on the server computer system 12 and partly on other server computer systems and client computer systems operable to communicate with the server computer system 12 over the network 14. Moreover, the example methods described herein may be conducted entirely on the other server computer systems and client computer systems. Thus, it should be understood that the example methods described herein may be conducted on any combination of computers and computer systems. Furthermore, data described herein as being stored in the server computer system 12 or a client computer system 10 may alternatively be stored in any server computer system or any client computer system operable to communicate with the server computer system 12 and/or the client computer system 10 over the network 14. Additionally, the example methods described herein may be implemented with any number and organization of computer program components. Thus, the methods described herein are not limited to specific computer-executable instructions. Alternative example methods may include different computer-executable instructions or components having more or less functionality than described herein.

Although the example methods and systems described herein use key event data generated by a keyboard to calculate the distribution of temporal differences between key events, input data generated by a different input device may alternatively be used to calculate a distribution of temporal differences between input events. Such other input devices include, but are not limited to, a mouse, a joystick, and a gamepad. Moreover, different types of input data may be captured and a temporal distribution may be calculated for each type of input data. A clustering tendency and period may be calculated for each temporal distribution, and a client computer system may be identified based on the clustering tendencies and periods. More specifically, the clustering tendencies and periods may be compared against corresponding data for other client computer systems to determine a match.

Although the server computer system 12 compares requesting client computer system data against records stored therein to identify the requesting client computer system 10, the server computer system 12 may additionally, or alternatively, compare the requesting client computer system data against records generated by and/or stored in a different server computer system. Doing so may facilitate increasing the likelihood of a successful match.

In example embodiments, the above-described methods and systems enhance the accuracy and trustworthiness of client computer system identification. More specifically, while a client computer system accesses a server computer system, the server computer system captures key event data from the client computer system. The server computer system calculates, from the key event data, a distribution of temporal differences between key events, and calculates a clustering tendency and a clustering period for the distribution. The clustering tendency and period are compared against corresponding data stored in the server computer system for client computer systems that previously requested access to the server computer system. When the clustering tendency and period match the corresponding data of a client computer system, the client computer system is successfully identified as the matching client computer system. As a result, accurate and trustworthy client computer system identification results are facilitated to be enhanced using easily and inexpensively captured data. Moreover, because only the clustering tendency and clustering period are used to identify a client computer, the time and costs of identifying a client computer system are facilitated to be reduced.

The example methods for identifying a client computer system described above should not be considered to imply a fixed order for performing the method steps. Rather, the method steps may be performed in any order that is practicable, including simultaneous performance of at least some steps. Moreover, the method steps may be performed in real time or in near real time. It should be understood that, for any process described herein, there can be additional, fewer, or alternative steps performed in similar or alternative orders, or in parallel, within the scope of the various embodiments, unless otherwise stated. Furthermore, the invention is not limited to the embodiments of the methods described above in detail. Rather, other variations of the methods may be utilized within the spirit and scope of the claims.

What is claimed is:

1. A method for identifying a client computer system by a server computer system comprising the steps of:
    granting access, by the server computer system, to the client computer system;
    capturing input data from the client computer system, by the server computer system, the input data being generated by activity of an input device included in the client computer system;
    calculating temporal differences from the captured input data;
    calculating a distribution from the temporal differences;
    calculating from the captured input data a clustering tendency and a clustering period for the calculated distribution, the clustering tendency and clustering period being determined based on characteristics of the computer system independent of user input actions;
    comparing the calculated clustering tendency and period against the clustering tendency and clustering period, respectively, of other client computers; and
    identifying, by the server computer system, the client computer system as a matching client system when the calculated clustering tendency and clustering period match the clustering tendency and clustering period of one of the other client computer systems.

2. A method of identifying a client computer system in accordance with claim 1, said capturing input data step further comprising capturing additional identifying data from the client computer system.

3. A method of identifying a client computer system in accordance with claim 2, said comparing step further comprising comparing the additional identifying data against corresponding data of the other client computer systems.

4. A method of identifying a client computer system in accordance with claim 1, wherein the input data comprises pairs of input event times and said calculating temporal differences step comprises computing the difference between all pairs of input event times.

5. A method of identifying a client computer system in accordance with claim 1, said calculating temporal differences step comprising:
    defining groups of times at which input events were captured; and
    calculating, for each group, the difference between one time and each other time in the group.

6. A method of identifying a client computer system in accordance with claim 1, said identifying step further comprising identifying the requesting client computer system as a laptop computer or a desktop personal computer based on the clustering tendency.

7. An apparatus for identifying a client computer system comprising:
    a processor; and
    a memory configured to store data, said apparatus being associated with a network and said memory being in communication with said processor and having instructions stored thereon which, when read and executed by said processor, cause said apparatus to:
    grant access to a client computer system;
    capture input data from the client computer system, the data being generated by activity of an input device included in the client computer system;
    calculate temporal differences from the captured input data;
    calculate a distribution from the temporal differences;
    calculate from the captured input data a clustering tendency and a clustering period for the calculated distribution, the clustering tendency and clustering period being determined based on characteristics of the computer system independent of user input actions;

compare the calculated clustering tendency and period against the clustering tendency and clustering period, respectively, of other client computers; and identify the client computer system as a matching client computer system when the calculated clustering tendency and clustering period match the clustering tendency and clustering period of one of the other client computer systems.

8. An apparatus for identifying a client computer system in accordance with claim 7, wherein the instructions when read and executed by said processor, further cause said apparatus to capture additional identifying data from the client computer system.

9. An apparatus for identifying a client computer system in accordance with claim 8, wherein the instructions when read and executed by said processor, further cause said apparatus compare the additional identifying data against corresponding data of the other computer systems.

10. An apparatus for identifying a client computer system in accordance with claim 7, wherein the input data comprises pairs of input event times and the instructions when read and executed by said processor, further cause said apparatus to compute the difference between all pairs of input event times.

11. An apparatus for identifying a client computer system in accordance with claim 7, wherein the instructions when read and executed by said processor, further cause said apparatus to:
define groups of times at which input events were captured; and
calculate, for each group, the difference between one time and each other time in the group.

12. An apparatus for identifying a client computer system in accordance with claim 7, wherein the instructions when read and executed by said processor, further cause said apparatus to identify the client computer system as a laptop computer or a desktop personal computer based on the clustering tendency.

13. A method for identifying a client computer system by a server computer system comprising the steps of:
granting access, by the server computer system, to the client computer system;
capturing input device data, by the client computer system, generated by activity of at least one input device included in the client computer system;
calculating, by the client computer system, a distribution for each of the at least one input devices from the captured data;
calculating from the captured input device data, by the client computer system, a clustering tendency and a clustering period for each calculated distribution, each clustering tendency and each clustering period being determined based on characteristics of the respective input device independent of user input actions;
comparing the clustering tendency and period calculated for each input device against the corresponding data of other client computer systems; and
identifying, by the server computer system, the client computer system as a matching client system when the calculated clustering tendencies and periods match the corresponding data for one of the other client computer systems.

14. A method of identifying a client computer system in accordance with claim 13, said capturing input device data step further comprising capturing additional identifying data from the client computer system.

15. A method of identifying a client computer system in accordance with claim 13, wherein the input data comprises pairs of input event times and said calculating temporal differences step comprises computing the difference between all pairs of input event times for each respective input device.

16. A method of identifying a client computer system in accordance with claim 13, said calculating temporal differences step comprising:
defining groups of times at which input events were captured for each respective input device; and
calculating, for each group, the difference between one time and each other time in the group.

17. A method of identifying a client computer system in accordance with claim 13, said identifying step further comprising identifying the requesting client computer system as a laptop computer or a desktop personal computer based on the clustering tendencies.

18. A method of identifying a client computer system in accordance with claim 3, said identifying step further comprising identifying the client computer system as the matching client computer system when the additional identifying data matches the corresponding data of the one other client computer system.

19. An apparatus for identifying a client computer system in accordance with claim 9, wherein the instructions when read and executed by said processor, further cause said apparatus to identify the client computer system as the matching client computer system when the additional identifying data matches the corresponding data of the one other client computer system.

* * * * *